United States Patent [19]

Bain

[11] 4,125,073
[45] Nov. 14, 1978

[54] IMPACT DAMPING OF PRINTING CYLINDERS

[75] Inventor: Lawrence J. Bain, La Grange, Ill.

[73] Assignee: Rockwell International Corporation, Pittsburgh, Pa.

[21] Appl. No.: 849,775

[22] Filed: Nov. 9, 1977

[51] Int. Cl.² ............................................. B41F 5/00
[52] U.S. Cl. ............................... 101/216; 101/415.1; 74/574
[58] Field of Search ............... 101/216, 212, 395, 375, 101/376, 378, 415.1; 74/604, 574; 188/1 B, 268; 100/162 B, 168

[56] References Cited

U.S. PATENT DOCUMENTS

| | | | |
|---|---|---|---|
| 2,029,796 | 2/1936 | Salomon | 74/574 |
| 2,285,072 | 6/1942 | Zdanowich | 74/604 |
| 3,177,804 | 4/1965 | Koch | 101/177 |
| 3,256,812 | 6/1966 | Karrenbauer | 101/216 |
| 3,395,638 | 8/1968 | Kirkus et al. | 101/216 |
| 3,589,285 | 6/1971 | Anderson | 101/216 |

Primary Examiner—J. Reed Fisher

[57] ABSTRACT

A printing press provides a pair of cylinders mounted for rotation about parallel axes. At least one of the cylinders carries a member wrapped thereon having circumferentially spaced edges defining a gutter. When the cylinders are rotated, an impact is generated when the gutter juxtaposes the adjacent cylinder thereby generating oscillatory movement in at least one of the cylinders. An impact damper mechanism is provided for minimizing the amplitude of all oscillations occurring after the gutter moves out of the nip and for rapidly degrading the following oscillations.

14 Claims, 6 Drawing Figures

IMPACT DAMPING OF PRINTING CYLINDERS

This invention relates to printing presses and more particularly to a printing press comprising a pair of cylinders mounted for rotation about generally parallel axes incorporating therewith an impact damping mechanism for degrading oscillatory movement an impact damping mechanism for degrading oscillatory movement of the cylinders generated during normal operation.

One of the problems inherent in the high speed operation of rotary presses is known in the art as "streaking" in the printed product which is particularly noticeable when there are dark areas on the leading edge of the printing plate. Streaking is evidenced by alternating light and dark stripes which are parallel to the cylinder axis and which extend across the printed page at more-or-less equally spaced intervals.

One explanation for this phenomenon resides in the presently used technique for securing printing plates to plate cylinders and blankets to either blanket or impression cylinders. Taking an offset lithographic press as exemplary, the printing plate comprises a thin metal sheet wrapped substantially about the plate cylinder but having spaced apart ends curled inwardly toward the cylinder interior where a lockup mechanism tensions the plate in place about the cylinder. The blanket cylinder mounts, in a similar fashion, a blanket providing spaced ends. The space on the cylinder circumference between the exposed edges of the printing plate or blanket is called a gap or gutter which extends parallel to the cylinder axes. The plate and blanket cylinders are sized and synchronized so that the gutters meet in the nip between the cylinders during each cylinder revolution. It appears that the plate cylinder in an offset press and the plate and impression cylinder in a direct press vibrate in a plane defined by the cylinder axes because, as the cylinders roll over the gutters, the impression force which is required for uniform ink transfer is suddenly relieved and reapplied. This force constitutes a single impact delivered once during each revolution of the plate and blanket cylinders.

Notwithstanding the mass and apparent rigidity of typical printing cylinders, it has been found that there is sufficient resiliency in the cylinders and their mountings to allow the cylinders to move relatively toward and away from one another as the gutters meet thereby establishing oscillatory movement of the plate cylinder in an offset press and of both the plate and impression cylinders in a direct press or letterpress. In conventional presses, this oscillatory movement degrades in response, among other factors, to the size and rigidity of the cylinders and their mounting and the resilience of the blanket. It is evident that the relative movement of the cylinders at the instant the gutters meet and for a few degrees thereafter does not affect printing quality because there is no ink transfer during this interval. Instead, printing quality of impaired because of the oscillations that are induced in the cylinders after the gutters have passed out of juxtaposition and ink transfer recommences.

It is evident that the amplitude of oscillatory movement is a function, at least in part, of the rate of revolution of the printing cylinders and is consequently a function of printing speed. Accordingly, one of the practical limitations on printing speed is the onset of streaking.

The recognition and the cause of streaking and one technique for minimizing the oscillatory movement causing streaking is found in U.S. Pat. No. 3,395,638. The suggestion in this disclosure is that streaking can be minimized by reconfiguring the shape of the gutters in order to reduce the impact force created thereby.

Other disclosures of interest with respect to this invention are found in U.S. Pat. Nos. 2,306,959; 2,313,024; American Society of Mechanical Engineers, paper 73-DET-1, entitled "Optimum Design Parameters for Impact Dampeners" by M. A. Dokainish and H. Elmaraghy; American Society of Mechanical Engineers, paper 75-DET-81, entitled "The Application of Impact Dampeners to Continuous Systems" by R. K. Roy, R. D. Rocke, and J. E. Foster; and a publication in the Journal of the Acoustical Society of America, volume 53, number 1, 1973, pages 200–211, entitled "Response of the Impact Dampener to Stationary Random Excitation" by S. F. Masri and A. M. Ibrahim. These disclosures involve impact dampeners used on systems experiencing continuous forcing vibrations and not discrete impacts as in the present device. In addition, as will be more fully pointed out hereinafter, the device of this invention acts to suppress oscillations during only part of a revolution and is reset prior to the occurrence of a succeeding impact.

Also of some interest is the disclosure in U.S. Pat. No. 3,938,625 involving a device for damping abrupt movements of equipment.

In summary, one embodiment of this device comprises a printing press of the offset type including at least three cylinders mounted on the press frame for rotation about generally parallel axes. A printing plate is wrapped about one of the cylinders and is in contact with an adjacent cylinder. The printing plate, when wrapped about the first cylinder, provides circumferentially spaced apart edges defining a gutter. The second cylinder incorporates a resilient blanket wrapped about the second cylinder and having circumferentially spaced apart edges defining a gutter. The first and second cylinders are synchronized so that the gutters meet in the nip between the cylinders. Ink is applied to the printing cylinder which is transferred to the printing blanket during rotation of the cylinders. A print medium, usually paper in the form of a discrete sheet or an elongate web, passes between the second and third cylinders. Ink carried by the blanket cylinder is transferred to the paper.

The plate and blanket cylinders are forced together in a manner well known in the art. As mentioned previously, when the gutters on the plate and blanket cylinders pass through the nip, the force acting between the cylinders is relieved and reimposed causing the plate cylinder to begin oscillating in a plane defined by the axes of these cylinders. The blanket cylinder does not oscillate nearly as much as the plate cylinder, apparently because the blanket cylinder is engaged on the opposite side from the plate cylinder, by an impression cylinder or, in the case of a press simultaneously printing on both sides of the paper, by another blanket cylinder. An impact damping mechanism is incorporated in the plate cylinder for reducing the magnitude of oscillations after the first half cycle and for rapidly degrading the succeeding oscillations. The damping mechanism comprises a cage rigid with the plate cylinder having an inertial object movable therein through a path of movement extending, in a preferred embodiment of the invention, radially from a first location spaced from the axis of the cylinder to a second location where the center of gravity of the object is coaxial of the plate cylinder axis.

In essence, the action of the inertial object disorganizes the orderly process of amplitude buildup in the oscillating system thereby reducing the amplitude response dramatically. Accordingly, thereby reducing the amplitude response dramatically. Accordingly, when the gutters juxtapose, the inertial object moves from the first location to the second location and impacts the cage at a time generally out of phrase with the oscillation induced in the cylinder. This acts immediately to reduce the amplitude of oscillation in the print cylinder and allows the inherent damping features of the press to operate. Because the second half-cycle amplitude of the damped system is substantially less than the second half-cycle amplitude of the conventional system, the oscillations are capable of rapidly degrading. In addition, the object continues to oscillate in its cage out of phase with respect to the cylinder. This acts to increase the rate of amplitude suppression. Because the first location is radially outwardly spaced with the second object location, centrifugal force generated during rotation of the print cylinder causes the inertial object to move back to the first location during the ensuing revolution of the cylinder and prior to the occurrence of the next impact. Accordingly, the damping system is reset or conditioned to receive the next oscillation causing impact.

In another embodiment of the invention, a direct printing system incorporating a plate cylinder and an impression cylinder are mounted for rotation about generally parallel axes. A printing plate is placed about the first cylinder in contact with the second cylinder and provides circumferentially spaced apart edges defining a gutter. The impression cylinder includes a resilient blanket wrapped therearound connected in a comparable fashion to provide a gutter between the edges thereof. Paper passes between the plate and impression cylinders. Ink applied to the plate cylinder is transferred to the paper passing through the nip of the cylinders. Rotation of the cylinders generates oscillatory movement of both the plate and impression cylinders in response to an impact generated when the gutters are juxtaposed in the nip of the cylinders. An impact damping mechanism of substantially the same configuration as that previously described is disposed in the print cylinder, in the impression cylinder or preferably in both to dampen the oscillations and thereby minimizing streaking.

An offset printing press manufactured by the assignee of this invention has been designed to incorporate the impact damping mechanism of this invention. The plate and blanket cylinders of this machine are approximately 7 ¼ inch in diameter. The plate cylinder gap was selected to be 0.490 inches and the blanket cylinder gap was selected to 0.6875 inches. The normal maximum operating speed of this press, an earlier version of which was known as a Suburban, prior to being modified with the impact damper of this invention as well as other design changes, was approximately 25,000 revolutions per hour prior to the onset of streaking. After the modifications, the maximum design speed of this machine is 40,000 revolutions per hour prior to the onset of streaking. It is estimated that this invention stretches the design speed of this machine from approximately 35,000 rph to 40,000 rph.

It is an object of this invention to provide an improved printing press which is capable of high speed operation and which substantially avoids problems of streaking in the final printed product.

Another object of this invention is to provide an improved printing press incorporating a printing cylinder having an impact damper operatively associated therewith.

Other objects and a fuller understanding of the invention may be had by referring to the following description and claims taken in conjunction with the accompanying drawings.

Figure 1:
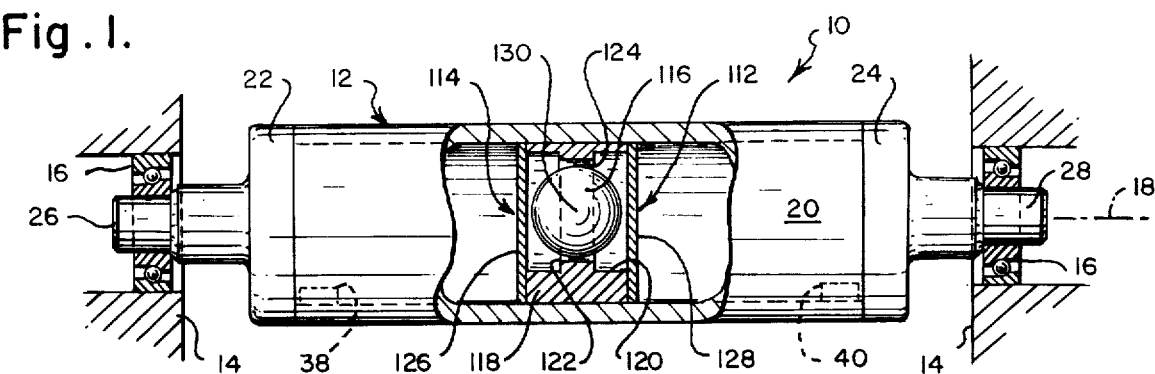
FIG. 1 is a broken side elevational view of a printing cylinder and mounting incorporating an impact damping mechanism of this invention.
Figure 2:
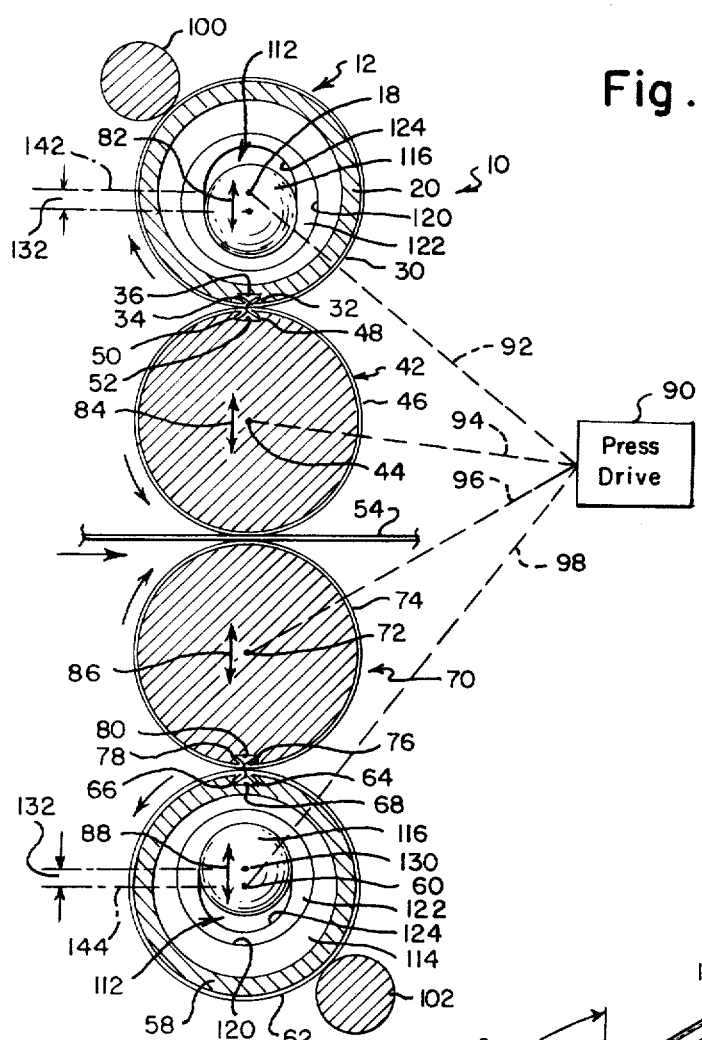
FIG. 2 is a transverse cross sectional view of a plurality of printing cylinders disposed in an offset relationship to print opposite sides of a sheet or web.

Referring to FIGS. 1 and 2, there is illustrated an offset printing press 10 comprising an upper plate cylinder 12 mounted in a frame 14 by a pair of bearings 16 for rotation about an axis 18. The upper plate cylinder 12 includes a tubular member 20 closed by end cap structures 22, 24 providing a stub shaft 26, 28 received in the bearings 16. The upper plate cylinder 12 also includes a printing plate 30 wrapped therearound having ends 32, 34 captivated in a lockup gap or recess 36 by a conventional schematically illustrated lockup mechanism 38, 40. A gap or gutter is defined on the circumference of the plate 30 between the facing edges of the curled ends 32, 34. The gutter extends, of course, substantially parallel to the cylinder axis 18.

Cooperating with the plate cylinder 12 is a blanket cylinder 42 comprising a solid cylindrical forging mounted for rotation about an axis 44 parallel to the axis 18. The blanket cylinder 42 includes a conventional blanket 46 which acts to receive ink from the plate 30 and which is made of a slightly yieldable or resilient material to insure proper contact with the printing plate 30 and paper which is being printed on. The blanket 46 includes ends 48, 50 captivated in a lockup gap or recess 52 by a suitable lockup mechanism (not shown). A gap or gutter is defined on the circumference of the blanket 46 between the facing edges of the curled ends 48, 50. The gutter extends, of course, substantially parallel to the cylinder axis 44.

The offset printing press 10 is illustrated of the type capable of simultaneously printing on opposite sides of a sheet or web of paper 54 although the invention is capable of use in an offset press printing on only one side of the paper. The press 10 accordingly comprises a lower plate cylinder 56 including a tubular member 58 mounted for rotation about an axis 60. The lower plate cylinder 56 also includes a printing plate 62 wrapped therearound having ends 64, 66 captivated in a lockup gap or recess 68 by a conventional lockup mechanism (not shown). A gap or gutter is defined on the circumference of the plate 58 between the facing edges of the curled ends 64, 66. The gutter extends, of course, substantially parallel to the cylinder axis 60.

Cooperating with the plate cylinder 56 is a blanket cylinder 70 including a solid generally cylindrical forging mounted for rotation about an axis 72 parallel to the axis 60. The blanket cylinder 70 includes a conventional blanket 74 which acts to receive ink from the plate 62 and which is made of a slightly yieldable or resilient material to ensure proper contact with the printing plate 62 and paper 54 which is being printed on. The blanket 74 provides ends 76, 78 captivated in a lockup gap or recess 80 by a suitable lockup mechanism (not shown). A gap or gutter is defined on the circumference of the blanket 74 between the facing edges of the curled ends 76, 78. The gutter extends, of course, substantially parallel to the cylinder axis 72.

To provide appropriate ink transferring contact between the plate cylinders 12, 56 and the blanket cylinders 18, 70 and to provide printing contact between the blanket cylinders 42, 70 and the paper 54 being printed upon, suitable adjusting means schematically illustrated by the arrows 82, 84, 86, 88 are provided for biasing the cylinders together.

In order to rotate the cylinders in unison, the cylinders, with the plates and blankets attached, are of the same nominal working diameter and are actuated by a typical press drive 90 having driving connections 92, 94, 96, 98. As the cylinders rotate in unison, the same point on the circumference of the plate cylinder 12 always coincides with the same point on the blanket cylinder 38 so that the gutters of the cylinders 12, 42 will always meet in the nip between the cylinders during each revolution. Similarly, the relationship between the blanket cylinders 42, 70 is such that the gutter will always meet in the nip between these cylinders and that each point on the circumference of the blanket cylinder 42 always meets with the same point on the cylinder 70 during each revolution. In a similar fashion, the relationship between the print cylinder 56 and the blanket cylinder 70 is controlled.

In operation, ink and, if required, a damping or fountain solution are applied to the printing plates 30, 62 by the use of typical rollers 100, 102. Ink is transferred from the printing plates 30, 62 to the blankets 46, 74 and is, in turn, transferred to opposite sides of the paper 54. It will be apparent to those skilled in the art that the foregoing description is illustrative of an offset press capable of printing simultaneously on opposite sides of the same sheet or web. In particular, this description is typical of presses made by the Graphic Systems Division of the assignee of this invention. For greater particulars in the operation and construction of a press of this type, reference is made to appropriate publications of Rockwell International.

When the cylinders 12, 42 are in any position other than that shown in FIG. 2, the adjusting mechanisms 82, 84 provide a force or load biasing these cylinders together. As the cylinders move into the relationship illustrated in FIG. 2, the gutters begin to meet so that the printing plate 30 is not in direct contact with the blanket 46 or is in reduced contact therewith. There is accordingly a marked reduction in the force resisting that applied by the adjusting mechanisms 82, 84.

Figure 3:
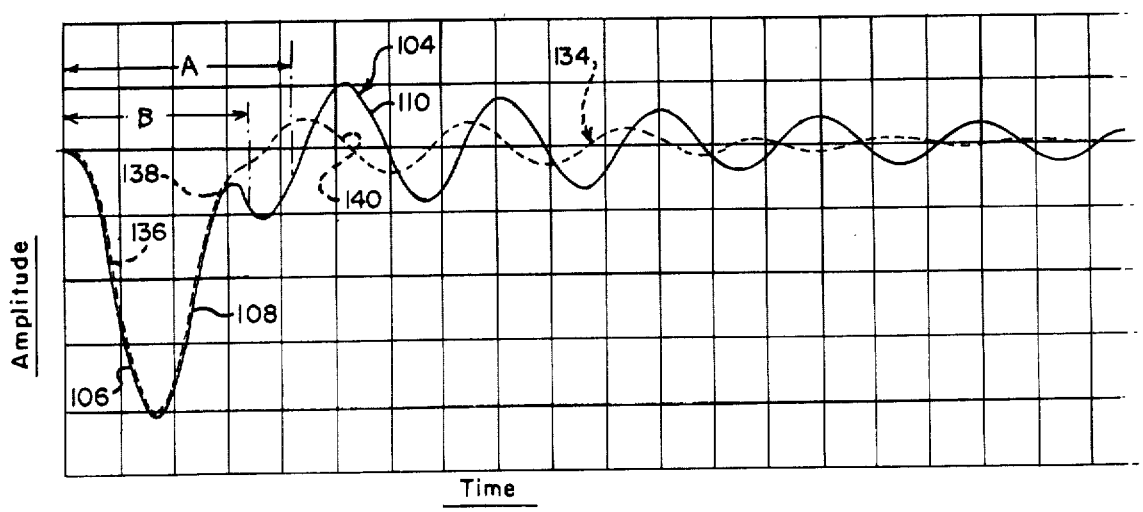
FIG. 3 is a graph illustrating the oscillations set up in a conventional printing cylinder and the oscillations set up in a printing cylinder equipped with the damping mechanism of this invention.

Referring to FIG. 3, the interval during which the gutters of a conventional offset press are juxtaposed is represented by A and the oscillatory pattern induced is represented by the solid curve 104. The ordinate of FIG. 3 represents the amplitude of movement of the plate cylinder at the midpoint between its bearings. As the gutters approach in the nip between the cylinders, the plate cylinder moves as described by a curve segment 106. As the gutters begin moving out of registration, the cylinder begins moving as described by a curve segment 108. The amplitude of the half cycle formed by the curve segments 106, 108 does not directly impair print quality because there is no ink transferred during the interval that the gutters are in the nip of the cylinders. The magnitude of the first half cycle 110 after the interval A probably does not directly impair print quality because substantially all pages have a margin on each side so that no ink transfer is occurring during this interval.

The amplitude of the half cycles succeeding the first half cycle 110 progressively decline in accordance with the mass and rigidity of the vibrating cylinder in its mountings, the resiliency of the blanket engaging the vibrating cylinder and other similar factors. It is evident that the amplitude of the succeeding half cycles can be significant for a considerable number of half cycles. In the system run to generate the curve 104, the frequency of oscillations after the interval A were at a frequency of about 250–300 cycles per second. The oscillation frequency is a function of the press design and is essentially independent of the rate of rotation. Thus, in a very high speed press, for example 40,000 revolutions per hour, four cycles of oscillation would amount to 64° of cylinder rotation which is about one-sixth of each impression. It is accordingly apparent that rapid suppression or degradation of the oscillatory movement is of considerable importance.

Figure 4:
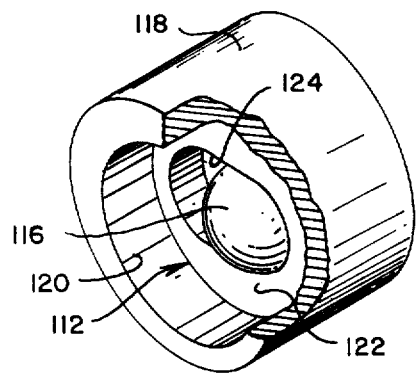
FIG. 4 is a broken isometric view of the impact damper of this invention.

Referring to FIGS. 1, 2 and 4, the plate cylinders 12, 56 are provided with an impact damper 112 of this invention comprising a cage 114 and an inertial object 116. The cage 114 comprises a cylindrical plug 118 rigidly fixed inside the tubular members 20, 58 having an off center passage 120 extending therethrough interrupted by a central rib 122 having an opening 124 therein. The cage 114 also comprises end plates 126, 128 affixed to the plug 118 and extending generally perpendicular to the axes 18, 60 for constraining movement of the inertial object 116 substantially wholly in the opening 124.

The inertial object 116 preferably has a minimal amount of frictional drag during movement relative to the opening of 124. Although the object 116 conceivably could be of any surface of revolution such as cylindrical, it is preferred that the object 116 be spherical. The sphere 116 and the rib 122 are preferably metal and exhibit smooth surfaces. The mass of the sphere 116 and particularly the ratio of the mass 116 to the mass of the cylinder 12 affects the efficiency of the damper 112. In general, the greater the relative mass of the sphere 116, the greater will be the efficiency of the damper 112 until the mass of the sphere 116 becomes so large that the oscillation of the entire vibrating system begins to assume the oscillating characteristics of the sphere 116 rather than of the cylinder 12. Techniques for determining the optimum size of the mass of the sphere 116 are disclosed in the previously cited publications. It will suffice for present purposes to note that the mass of the sphere 116 selected at 5% of the mass of the cylinder 12 acts to substantially increase the rate of amplitude degradation as will be more fully pointed out hereinafter.

It will be evident that the opening 124 defines a path of movement of the sphere 116. The total amount of movement of which the sphere 116 is capable is dependent on a number of factors. The external diameter of the cylinders 12, 56 and the necessary wall thickness of the tubes 20, 58 dictate the maximum theoretical distance of travel. The diameter of the sphere 116 also provides a design constraint. In addition, for reasons more fully pointed out hereinafter, it is important that the center of gravity 130 of the sphere 116 should not, in a preferred embodiment of the invention, travel from the position illustrated in FIG. 2 to the opposite side of the cylinder axes 18, 60. Accordingly, the maximum practical distance through which the sphere 116 can move is fairly closely constrained by the inherent characteristics of a rotary printing press. The maximum amplitude of the first half cycle of oscillation, indicated by the curve segments 106, 108, is on the order of about 0.004 inches in the cylinders of the Suburban press. The selected amplitude of movement of the spheres 116, represented by the arrows 132, was selected to be 0.012 inches. Optimization of the distance the sphere 116 is capable of traveling may be done in a manner shown in the publications previously cited.

The shape of the opening 124 is desirably complementary to the curvature of the sphere 116. Accordingly, in a preferred embodiment of the invention, the opening 124 comprises two facing semicircles on different centers 18, 130 connected by a pair of tangential lines. It will be apparent that a rubber or other elastic bumper may be placed in the opening 124 at either or both ends.

In the illustrated preferred embodiment of the damper 112, the initial direction of movement of the sphere 116 is substantially radially in a path defined by the axes of the cylinders 12, 42. Accordingly, movement of the sphere 116 is initially coplanar with the oscillations of the cylinder 12. After some rotation of the cylinder 12, it will be apparent that the sphere 116 is oscillating in a plane inclined to the plane of oscillations of the cylinder 12 because the cylinder oscillations apparently do not rotate. It will be evident to those skilled in the art that the direction of movement of the sphere 116 can be modified to be offset from a radial line, somewhat inclined thereto, or in other manners that retain a significant proportion of the effectiveness of the damper 112.

One of the basic difficulties in applying known impact damping techniques to printing cylinders is that the prior art dampers have been employed in systems subjected to continuously acting forces inducing the vibrations. This is significantly different from the present situation where the impact inducing force occurs once per cycle of operation and the induced vibration dies out from inherent damping prior to the occurrence of the next oscillation inducing impact. Another basic difficulty in utilizing known impact damping techniques in printing presses is that because they are subjected to continuously acting forces inducing vibration, there is no significant starting place, no teaching of the need for a starting place and no solution for attaining a starting place should one become significant. Furthermore, the prior techniques fail to suggest that a starting place, should one be significant, be established to expect an impact force from a particular direction. Another basic difficulty in utilizing impact dampers in rotating systems is that the direction of oscillations which is intended to be damped must be correlated with the direction of movement of the inertial object in the damper. In the present situation, the vibrations in the cylinders remains in the plane defined by the cylinder axes while the damper object oscillates in a rotating plane.

Referring to FIG. 3, the interval B represent the time during which the cylinders 12, 42 are in juxtaposition and the oscillatory pattern induced in the cylinder 12 is represented by the dashed curve 134. It will be noted that the intervals A, B are not identical because the gutter lengths of the conventional and modified devices are slightly different. As the gutters of the plate and blanket cylinders 12, 42 move into juxtaposition, the plate cylinder 12 moves relatively toward the blanket cylinder 42 as represented by a curve segment 136. As the gutters of the cylinders 12, 42 begin to move out of registration, the cylinder 12 returns toward its original position as represented by a curve segment 138. It will be noted that the half cycle comprising the curve segments 136, 138 is of substantially the same amplitude as the half cycle comprised of the curve segments 106, 108. The amplitude of this half cycle is dependent on the degree of movement of which the plate cylinder 12 is capable and is normally at least partially a function of the thickness of the printing plate 30 and the blanket 46.

At the end of the interval B, the gutters of the cylinders 12, 42 are out of registration and the printing plate 30 has again established substantial contact with the blanket 46. The impact delivered to the cylinder 12 as the gutters pass into and out of registration constitutes an impact to the cylinder 12 in the plane of the axes 18, 44. This impact transfers momentum to the sphere 116 and moves it upwardly in the path of movement afforded by the rib opening 124. At the instant the impact is generated, the cylinder 12 and the sphere 116 are moving in the same direction at the same rate. At a time corresponding to the approach of the cylinder 12 to its first half cycle amplitude, the cylinder 12 is either slowing down or has changed direction of movement while the sphere 116 retains its original velocity. Accordingly, the sphere 116 contacts the rib 122 at the opposite end of its path of travel. Because the cylinder 12 and consequently the rib 122 are moving downwardly relative to the sphere 116, momentum is transferred to the sphere 116 whereupon radially outward movement of the sphere 116 commences. It will be seen that the sphere 116 is caused to oscillate out of phase with respect to the primary oscillations induced in the cylinder 12. Because the oscillations are essentially out of phase, the amplitudes subtract thereby exhibiting a decreased resultant amplitude in even the first half cycle 140 following the interval B. The out of phase oscillations of the sphere 116 continues so long as the cylinder 12 is vibrating thereby progressively reducing the amplitude of each succeeding half cycle. It is accordingly apparent from FIG. 3 that the oscillations of the cylinder 12 are essentially gone at the end of five half cycles after the interval B and that the amplitude of each half cycle is considerably smaller than the amplitude of the corresponding half cycle of the conventional system illustrated by the curve 104.

The damping effected by the damper 112 is largely accomplished within a few degrees of rotation of the cylinder 12. Testing to date indicates that the oscillations in the plate cylinder 12 have substantially stopped within about thirty degrees of the relationship illustrated in FIG. 2.

In the vertically stacked cylinder arrangement of FIG. 2, it will be evident that centrifugal force plus the effect of gravity acts on the sphere 116 in the upper cylinder 12 while centrifugal force less the effect of gravity acts on the sphere 116 in the lower cylinder 56. Although this will have some effect, it is believed to be minimal. In a press where the cylinders are horizontally spaced, it will be apparent that gravity equally affects the inertial objects 116 so that there is no difference in effectiveness of the dampers 112.

One of the problems associated with applying impact damper techniques lies in recognizing the need for and effecting resetting of the spheres 116 after one set of oscillations has died out and prior to the generation of a succeeding impact caused by the gutters passing into and out of registration. In the preferred embodiment of the invention, centrifugal force is utilized to move the spheres 116 to the position illustrated in FIG. 2. When utilizing centrifugal force to reset the spheres 116, it is evident that the center of gravity should not be allowed to pass beyond a horizontal plane 142, 144 in order to assure that the sphere 116 will move to its radially outermost position.

Figure 5:
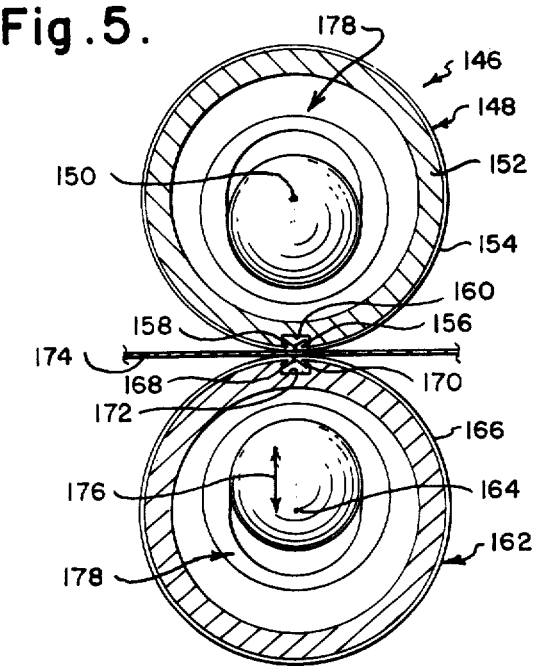
FIG. 5 is a view similar to FIG. 2 illustrating the damping mechanism in a direct printing arrangement.

Referring to FIG. 5, there is illustrated a direct printing arrangement 146 comprising a plate cylinder 148 mounted for rotation about an axis 150 and comprising a tubular member 152 carrying a printing plate 154 providing ends 156, 158 captivated in a lockup gap or recess 160 by a suitable lockup mechanism (not shown). A gap or gutter is defined on the circumference of the plate 154 between the facing edges of the curled ends 156, 158.

Cooperating with the plate cylinder 148 is an impression cylinder 162 mounted for rotation about an axis 164 parallel to the axis 150. The impression cylinder 162 includes a conventional blanket 166 having ends 168, 170 captivated in a lockup gap or recess 172 by a conventional lockup mechanism (not shown). The blanket 166 acts as a backup for a web or sheet 174 to ensure appropriate contact between the web 174 and the type face on the plate 154 notwithstanding minor variations in the height of the type face. To secure the printing contact, the cylinder 162 is adjustably advanced toward the plate cylinder 148 by an adjustable mechanism schematically illustrated by an arrow 176. The adjusting mechanism 176 advances the impression cylinder beyond the point of barely touching between the type face and the web 168, squeezing the plate and impression cylinders 148, 162 together by an additional increment of distance thus creating pressure loading between the cylinders 148, 162.

Rotation of the cylinders 148, 162 generates an impact force as the gutters of the printing plate 154 and blanket 166 pass into and out of registration. The plate cylinder 148 and the impression cylinder 162 accordingly begin to vibrate in a plane defined by the axes 150, 164. In order to rapidly suppress or degrade this oscillatory movement, a damper 178 is preferably provided in both the plate and impression cylinders 148, 162.

Figure 6:
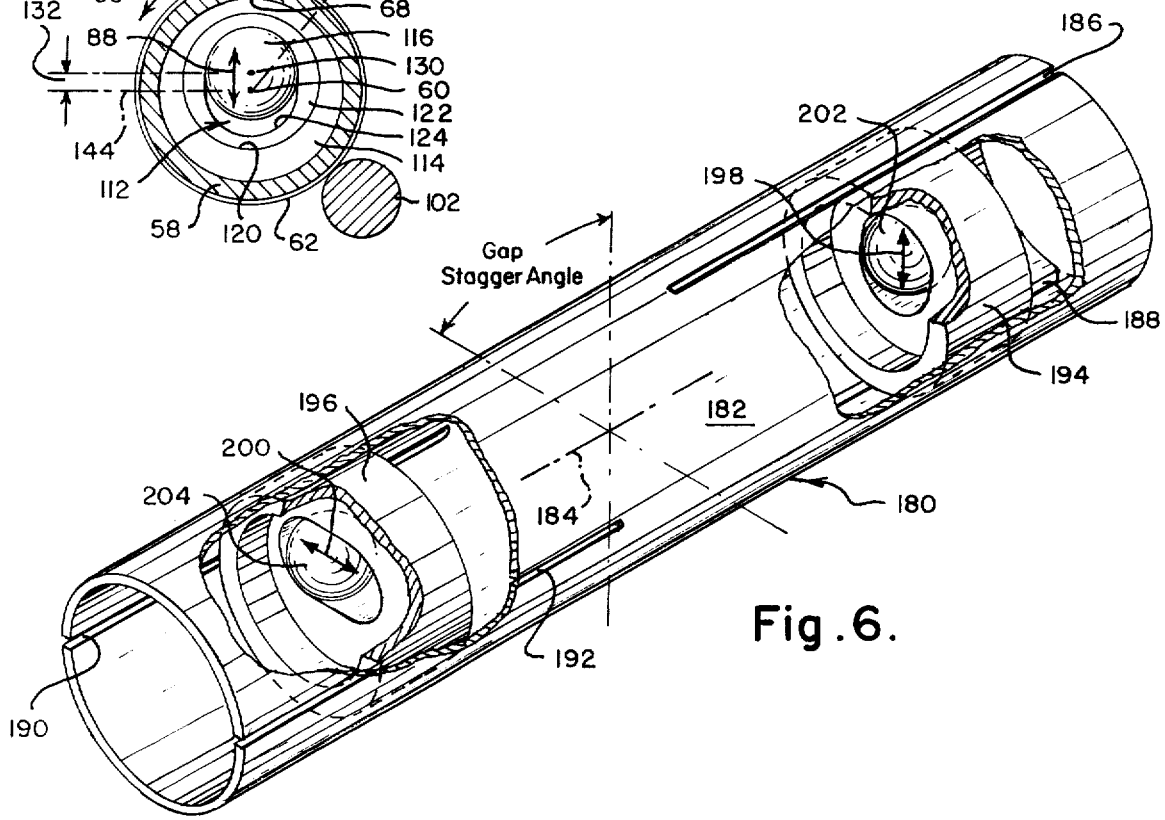
FIG. 6 is a broken isometric view of another type plate cylinder in which the damper of this invention may be used.

Referring to FIG. 6, there is illustrated a plate cylinder 180 of a wide press comprising a tubular member 182 mounted for rotation about an axis 184. In wide presses, the unsupported length or aspect ratio of the tube 182 is so great as to make the oscillations uncontrollable. It has accordingly been the practice to provide half-around plates connected in suitable lockup gaps and to stagger the gaps 186, 188 relative to the gaps 190, 192, typically by 90°, rather than use a continuous gap so that the tube 182 is partially supported when any of the gaps 186, 188, 190, 192 induce vibration.

In accordance with the principles of this invention, a plurality of substantially identical dampers are provided. In the event the blanket cylinder associated with the plate cylinder 180 has less than the number of gaps of the cylinder 180, it may be that fewer than four dampers will suffice. For convenience of illustration, only two dampers 194, 196 are shown. The dampers 194, 196 are associated with the gaps 186, 190 with the paths of movement 198, 200 placed in planes defined by the axis 184 and the gap 184 and defined by the axis 184 and the gap 190 respectively. The inertial objects 202, 204 of the dampers 194, 196 are accordingly offset toward the gaps 186, 190.

Although the invention has been described in its preferred forms with a certain degree of particularity, it is understood that the present disclosure of the preferred forms has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

I claim:

1. A printing press comprising
   a frame;
   first and second cylinders mounted on the frame for rotation about generally parallel axes, the first cylinder having a lockup gap on the periphery thereof for receiving the ends of a member, placed about the first cylinder, which define a gutter;
   means for rotatably driving the cylinders and initiating oscillatory movement of the first cylinder in a plane defined by the cylinder axes once per revolution of the cylinders in response to an impact generated when the gutter passes between the nip of the cylinder;
   means for applying ink to one of the cylinders; and
   means for damping the oscillatory movement in less than one revolution of the cylinders including
      a cage rigid with the first cylinder providing a path of object movement extending from a first location to a second location and providing a substantial component of object movement in the plane when the gutter passes between the nip of the cylinders;
      an object in the cage moveable from the first to the second location in response to the impact and thereafter oscillatable out of phase with respect to the cylinder oscillations;
      the damping means and the driving means being arranged to return the object to the first location prior to the occurrence of the impact generated on the next successive revolution of the cylinders.

2. The printing press of claim 1 wherein the first location is spaced radially from the axis of the first cylinder and the second location is radially inward of the first location.

3. The printing press of claim 2 wherein the path of object movement resides in the plane when the gutter passes between the nip of the cylinders.

4. The printing press of claim 3 wherein the path of object movement is substantially radial with respect to the axis of the first cylinder.

5. The printing press of claim 1 wherein the cage and object are disposed within the confines of the first cylinder.

6. The printing press of claim 4 wherein the object is a metal mass having an external surface defined by a radius.

7. The printing press of claim 5 wherein the object is a sphere.

8. The printing press of claim 1 whein the object returning means comprises means applying centrifugal force to the object.

9. The printing press of claim 1 wherein the center of gravity of the object is, in the first location, spaced from the axis of the first cylinder and is, in the second location, closer to the axis of the first cylinder.

10. The printing press of claim 1 further comprising a generally cylindrical member, mounted on the first cylinder in contact with the second cylinder and having circumferentially spaced apart edges defining the gutter and wherein the impact is generated when the gutter juxtaposes the second cylinder.

11. The printing press of claim 1 wherein the press is of the offset type, the first cylinder comprises a first plate cylinder and the second cylinder comprises a first blanket cylinder, and further comprising a second blanket cylinder and a second plate cylinder mounted on the frame for rotation about parallel axes and means for delivering a print medium between the first and second blanket cylinders.

12. The printing press of claim 1 wherein the first cylinder provides a second lockup gap circumferentially spaced from the first mentioned lockup at an angle other than 180°, and the first mentioned damping means is disposed in the cylinder adjacent the first lockup gap with the first mentioned path of movement being alined with the first lockup gap, and further comprising second damping means disposed in the first cylinder adjacent the second lockup gap having a second cage rigid with the first cylinder providing a second path of movement extending from a third location adjacent the second lockup gap to a fourth location, and a second object in the second cage moveable from the third to the fourth location in response to an impact generated with the second lockup gap passes between the nip of the cylinders and oscillatable out of phase with respect to the cylinder oscillations related to the second lockup gap, the damping means and the driving means being arranged to return the second object to the third location prior to the occurrence of the next impact generated when the second lockup gap again passes through the nip between the cylinders.

13. The printing press of claim 1 wherein the path of object movement is parallel to the plane when the gutter is in the nip between the cylinders.

14. The printing press of claim 1 wherein the damping means is of sufficient capacity to damp the oscillatory movement of the cylinders within less than about 30° of rotation of the cylinders past the gutter being in the nip between the cylinders.

* * * * *